US011323993B2

(12) United States Patent
Chen et al.

(10) Patent No.: US 11,323,993 B2
(45) Date of Patent: May 3, 2022

(54) METHODS AND APPARATUS FOR RESOURCE MANAGEMENT FOR ULTRA LOW LATENCY (ULL) AND LEGACY TRANSMISSIONS

(71) Applicant: QUALCOMM Incorporated, San Diego, CA (US)

(72) Inventors: Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 16/709,525

(22) Filed: Dec. 10, 2019

(65) Prior Publication Data
US 2020/0112947 A1 Apr. 9, 2020

Related U.S. Application Data

(63) Continuation of application No. 15/443,780, filed on Feb. 27, 2017, now abandoned.
(Continued)

(51) Int. Cl.
H04W 4/00 (2018.01)
H04W 72/04 (2009.01)
(Continued)

(52) U.S. Cl.
CPC ......... H04W 72/042 (2013.01); H04W 24/10 (2013.01); H04W 72/0446 (2013.01);
(Continued)

(58) Field of Classification Search
CPC ............... H04W 72/042; H04W 24/10; H04W 72/0446; H04W 72/1231; H04W 72/1268;
(Continued)

(56) References Cited

U.S. PATENT DOCUMENTS 10,904,903 B2 * 1/2021 Sebire .................. H04L 1/0018
10,993,224 B1 * 4/2021 Zhang .................. H04W 72/04
(Continued)

OTHER PUBLICATIONS

Huawei., et al., "Short TTI for DL Transmissions", 3GPP TSG RAN WG1, Meeting #84, St Julian's, Malta, R1-160292, Feb. 15-19, 2016, 7 pgs, XP051053632, Retrieved from the Internet: URL: http://www.3gpp.org/ftp/tsg_ran/WG1_RL1/TSGR1_84/Docs/R1-160292.zip [retrieved on Feb. 14, 2016].
(Continued)

Primary Examiner — Phuongchau Ba Nguyen
(74) Attorney, Agent, or Firm — Patterson + Sheridan, LLP

(57) ABSTRACT

Certain aspects of the present disclosure relate to methods and apparatus for resource management for ultra low latency (ULL) and legacy transmissions. Certain aspects provide a method that can be performed by a user equipment (UE) which may be a ULL capable UE. The method generally includes receiving information indicating a first configuration based on a first transmission time interval (TTI) and a second configuration based on a second TTI, wherein: the first TTI and the second TTI are each less than a third TTI; and the first TTI and the second TTI are different; and communicating based on the first TTI according to the first configuration and based on the second TTI according to the second configuration.

16 Claims, 12 Drawing Sheets

Related U.S. Application Data

(60) Provisional application No. 62/306,417, filed on Mar. 10, 2016.

(51) Int. Cl.
*H04W 24/10* (2009.01)
*H04W 72/12* (2009.01)

(52) U.S. Cl.
CPC ... *H04W 72/1231* (2013.01); *H04W 72/1268* (2013.01); *H04W 72/1273* (2013.01); *H04W 72/1289* (2013.01)

(58) Field of Classification Search
CPC ......... H04W 72/1273; H04W 72/1289; H04W 72/1263; H04W 28/04; H04W 72/04; H04W 88/08; H04W 52/346; H04W 4/06; H04W 76/14; H04W 28/16; H04W 28/26; H04W 52/16; H04W 52/281; H04W 52/325; H04W 52/343; H04W 52/365; H04W 52/367; H04W 52/383; H04W 72/005; H04W 72/078; H04W 76/15; H04W 88/06; H04W 92/12; H04W 24/04; H04W 48/10; H04W 48/12; H04W 4/22; H04W 4/90; H04W 52/0277; H04W 52/0296; H04W 52/146; H04W 72/0406; H04W 72/0413; H04W 72/0453; H04W 72/12; H04W 92/18; H04L 5/0007; H04L 5/0091; H04L 1/1896; H04L 5/001; H04L 5/14; H04L 12/1881; H04L 12/189; H04L 1/0003; H04L 1/0007; H04L 1/1822; H04L 1/1887; H04L 1/1893; H04L 41/06; H04L 5/0005; H04L 5/0014; H04L 5/003; H04L 5/0053; H04L 5/0094; H04L 5/22; H04B 7/2615; H04B 17/318; H04J 11/005; H04J 1/00; H04J 3/12; H04J 3/1694; H04Q 2213/13349

See application file for complete search history.

(56) References Cited

U.S. PATENT DOCUMENTS

| | | | | |
|---|---|---|---|---|
| 2011/0255483 | A1* | 10/2011 | Xu | H04L 25/0232 370/329 |
| 2014/0314007 | A1* | 10/2014 | Chen | H04B 7/00 370/329 |
| 2015/0085797 | A1* | 3/2015 | Ji | H04J 13/10 370/329 |
| 2016/0227520 | A1* | 8/2016 | Davydov | H04L 5/00 |
| 2016/0227541 | A1* | 8/2016 | Damnjanovic | H04L 5/001 |
| 2016/0295584 | A1* | 10/2016 | Chen | H04L 5/0048 |
| 2017/0265169 | A1 | 9/2017 | Chen et al. | |
| 2017/0290008 | A1 | 10/2017 | Tooher et al. | |
| 2018/0098235 | A1* | 4/2018 | Bagheri | H04W 72/082 |
| 2018/0115984 | A1* | 4/2018 | Sahlin | H04W 72/0413 |
| 2018/0302900 | A1* | 10/2018 | Ibars Casas | H04W 72/042 |
| 2019/0007181 | A1* | 1/2019 | Mariner | H04L 5/0007 |
| 2020/0112947 | A1 | 4/2020 | Chen et al. | |
| 2021/0076388 | A1* | 3/2021 | Miao | H04W 76/27 |

OTHER PUBLICATIONS

Alcatel-Lucent Shanghai Bell et al., "Overview of Specification Impact for TTI Shortening," 3GPP Draft; R1-156721 Overview of Specification Impact for TTI Shortening Final, 3rd Generation Partnership Project (3GPP), Mobile Competence Centre ; 650, Route Des Lucioles ; F-06921 Sophia-Antipolis vol. RAN WG1. No. Anaheim. US; Nov. 15, 2014-Nov. 22, 2015 Nov. 15, 2015 (Nov. 15, 2015). XP051003102. Retrieved from the Internet: URL:http://www.3gpp.org/ftp/Meetings_3GPP_SYNC/RAN1/Docs/— [retrieved on Nov. 15, 2015], 3 pages.

Ericsson: "Study of shorter TTI for latency reduction", 3GPP Draft; R2-153493, 3rd Generation Partnership Project (3GPP), Mobile Competence Centre; 650, Route Des Lucioles; F-06921 Sophia-Antipolis Cedex ; Franc, vol. RAN WG2, No. Beijing, China; Aug. 24, 2015-Aug. 28, 2015 Aug. 14, 2015 (Aug. 14, 2015), XP050993915, 5 pages. Retrieved from the Internet: URL: http://www.3gpp.org/ftp/tsg_ran/WG2_RL2/TSGR2_91/Docs/[retrieved on Aug. 14, 2015].

Huawei, et al., "Overview of short TTI" 3GPP Draft, R1-160291, 3rd Generation Partnership Project (3GPP), Mobile Competence Centre, 650 Route Des Lucioles, F-06921 Sophia-Antipolis Cedex, France, vol. RAN WG1 No. St Julian's Malta, Feb. 15, 2016-Feb. 19, 2016, Feb. 14, 2016 (Feb. 14, 2016), XP051053631, Retrieved from the Internet: URL: http://www.3gpp.org/ftp/Meetings_3GPP_SYNC/RAN1/Docs/.

Intel Corporation: "On Multiplexing of PDSCH with different TTIs and related Enhancements," 3GPP TSG-RAN WG1#84 R1-160862, 3GPP Draft; R1-160862, 3rd Generation Partnership Project (3GPP), Mobile Competence Centre; 650, Route Des Lucioles ; F-06921 Sophia-Antipolis Cedex ; France vol. RAN WG1, No. St Julian's, Malta; Feb. 15, 2016-Feb. 19, 2016 Feb. 6, 2016 (Feb. 6, 2016), XP051064411, Retrieved from the Internet: URL:http://www.3gpp.org/ftp/tsg_ran/WG1_RL1/TSGR1_84/Docs/R1-160862.zip [retrieved on Feb. 6, 2016], 3 pages.

International Search Report and Written Opinion—PCT/US2017/019918—ISA/EPO—dated Jun. 9, 2017.

Motorola Mobility: "Using Shortened DL TTI for Reduced Latency Data Transmission," 3GPP Draft; R1-160971_Shortened_TTI_V0, 3rd Generation Partnership Project (3GPP), Mobile Competence Centre ; 650, Route Des Lucioles ; F-06921 Sophia-Antipolis Cedex ; France, vol. RAN WG1, No. St. Julian's, Malta; Feb. 15, 2016-Feb. 19, 2016 Feb. 14, 2016 (Feb. 14, 2016), XP051054278, Retrieved from the Internet: URL:http://www.3gpp.org/ftp/Meetings_3GPP_SYNC/RAN1/Docs/ [retrieved on Feb. 14, 2016], 3 pages.

Nokia Networks et al., "Considerations of FDD DL HARQ for Supporting Latency Reduction," 3GPP Draft; R1-160798 Considerations of FDD DL Harq For Supporting Latency Reduction Final, 3rd Generation Partnership Project (3GPP), Mobile Competence Centre ; 650, Route Des Lucioles; F-86921 SOPH, vol. RAN WG1, No. St. Julian's, Malta; Feb. 15, 2016-Feb. 19, 2016 Feb. 5, 2016 (Feb. 5, 2016). XP051063904. Retrieved from the Internet: URL: http://www.3gpp.org/ftp/tsg ran/WG1_RL1/TSGR1_84/Docsj— [retrieved on Feb. 5, 2016], 4 pages.

Huawei, et al., "Control Signaling Enhancements for Short TTI", 3GPP Draft, 3GPP TSG-RAN WG1#83, R1-156461, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), XP051002921, 6 Pages, Nov. 7, 2015 (Nov. 7, 2015), Sections 2-3, Retrieved from the Internet: URL: http://www.3gpp.org/ftp/tsg_ran/WG1_RL1/TSGR1_83/Docs/R1-156461.zip.

Huawei, et al., "Overview of Short TTI", 3GPP Draft, R1-156458, 3GPP TSG RAN WG1 Meeting #83, 3rd Generation Partnership Project (3GPP), Mobile Competence Centre, 650, Route Des Lucioles, F-06921 Sophia-Antipolis, Cedex, France, vol. RAN WG1, No. Anaheim, USA, Nov. 15, 2015-Nov. 22, 2015, Nov. 15, 2015 (Nov. 15, 2015), XP051002918, 5 Pages, Nov. 7, 2015 (Nov. 7, 2015), Section 2, Retrieved from the Internet: URL: http://www.3gpp.org/ftp/tsg ran/WG1_RL1/TSGR1_83/Docs/R1-156458.zip [retrieved on Nov. 15, 2015].

* cited by examiner

1100

1102

RECEIVE INFORMATION INDICATING A FIRST CONFIGURATION BASED ON A FIRST TRANSMISSION TIME INTERVAL (TTI) AND A SECOND CONFIGURATION BASED ON A SECOND TTI, WHEREIN: THE FIRST TTI AND THE SECOND TTI ARE EACH LESS THAN A THIRD TTI; AND THE FIRST TTI AND THE SECOND TTI ARE DIFFERENT

1104

COMMUNICATE BASED ON THE FIRST TTI ACCORDING TO THE FIRST CONFIGURATION AND BASED ON THE SECOND TTI ACCORDING TO THE SECOND CONFIGURATION

FIG. 11

METHODS AND APPARATUS FOR RESOURCE MANAGEMENT FOR ULTRA LOW LATENCY (ULL) AND LEGACY TRANSMISSIONS

CROSS-REFERENCE TO RELATED APPLICATION & PRIORITY CLAIM

This application is a Continuation of U.S. application Ser. No. 15/443,780, filed Feb. 27, 2017, and claims benefit of and priority to U.S. Provisional Patent Application Ser. No. 62/306,417, filed Mar. 10, 2016, both of which are herein incorporated by reference in their entirety for all applicable purposes.

BACKGROUND

Field of the Disclosure

The present disclosure relates generally to wireless communication, and more particularly, to methods and apparatus for resource management for ultra low latency (ULL) and legacy transmissions.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations (BSs), each simultaneously supporting communication for multiple communication devices, otherwise known as user equipment (UEs). In long term evolution (LTE) or LTE Advanced (LTE-A) networks, a set of one or more BSs may define an enhanced/evolved Node B (eNB). In other examples (e.g., in a next generation, new radio (NR), or 5G network), a wireless multiple-access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a gNB, an access point (AP), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). An example of an emerging telecommunication standard is NR, for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in LTE technology and NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Aspects of the present disclosure provide mechanisms for resource management for ultra low latency (ULL) and legacy transmissions.

Aspects of the present disclosure provide a method for wireless communications by a user equipment (UE). The method generally includes receiving information indicating a first configuration based on a first transmission time interval (TTI) and a second configuration based on a second TTI, wherein: the first TTI and the second TTI are each less than a third TTI; and the first TTI and the second TTI are different; and communicating based on the first TTI according to the first resource and based on the second TTI according to the second configuration.

Aspects of the present disclosure provide a method for wireless communications by a base station (BS). The method generally includes determining a first TTI and a second TTI, wherein: the first TTI and the second TTI are each less than a third TTI; and the first TTI and the second TTI are different; determining a first configuration based on the first TTI and a second configuration based on the second TTI; and transmitting information indicating the first configuration for the first TTI and the second configuration for the second TTI.

Aspects of the present disclosure provide an apparatus for wireless communications by a UE. The apparatus generally includes means for receiving information indicating a first configuration based on a first TTI and a second configuration based on a second TTI, wherein: the first TTI and the second TTI are each less than a third TTI; and the first TTI and the second TTI are different; and means for communicating based on the first TTI according to the first configuration and based on the second TTI according to the second configuration.

Aspects of the present disclosure provide an apparatus for wireless communications by a BS. The apparatus generally includes means for a first TTI and a second TTI, wherein: the first TTI and the second TTI are each less than a third TTI; and the first TTI and the second TTI are different; means for determining a first configuration based on the first TTI and a second configuration based on the second TTI; and means for transmitting information indicating the first configuration for the first TTI and the second configuration for the second TTI.

Aspects of the present disclosure provide an apparatus for wireless communications by a UE. The apparatus generally includes at least one processor configured to receive information indicating a first configuration based on a first TTI and a second configuration based on a second TTI, wherein: the first TTI and the second TTI are each less than a third TTI; and the first TTI and the second TTI are different; and communicate based on the first TTI according to the first configuration and based on the second TTI according to the second configuration; and a memory coupled with the at least one processor.

Aspects of the present disclosure provide an apparatus for wireless communications by a BS. The apparatus generally includes at least one processor configured to determine a first TTI and a second TTI, wherein: the first TTI and the second TTI are each less than a third TTI; and the first TTI and the second TTI are different; determine a first configuration based on the first TTI and a second configuration based on the second TTI; and transmit information indicating the first configuration for the first TTI and the second configuration for the second TTI; and a memory coupled with the at least one processor.

Aspects of the present disclosure provide a computer readable medium having computer executable code stored thereon. The computer executable code generally includes code for receiving information indicating a first configuration based on a first TTI and a second configuration based on a second TTI, wherein: the first TTI and the second TTI are each less than a third TTI; and the first TTI and the second TTI are different; and code for communicating based on the first TTI according to the first configuration and based on the second TTI according to the second configuration.

Aspects of the present disclosure provide a computer readable medium having computer executable code stored thereon. The computer executable code generally includes code for determining a first TTI and a second TTI, wherein: the first TTI and the second TTI are each less than a third TTI; and the first TTI and the second TTI are different; code for determining a first configuration based on the first TTI and a second configuration based on the second TTI; and code for transmitting information indicating the first configuration for the first TTI and the second configuration for the second TTI.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the invention disclosure herein. In similar fashion, while exemplary aspects may be discussed below as device, system, or method aspects it should be understood that such exemplary aspects can be implemented in various devices, systems, methods, and computer readable media.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

FIG. 11 illustrates example operations for wireless communications by a UE, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
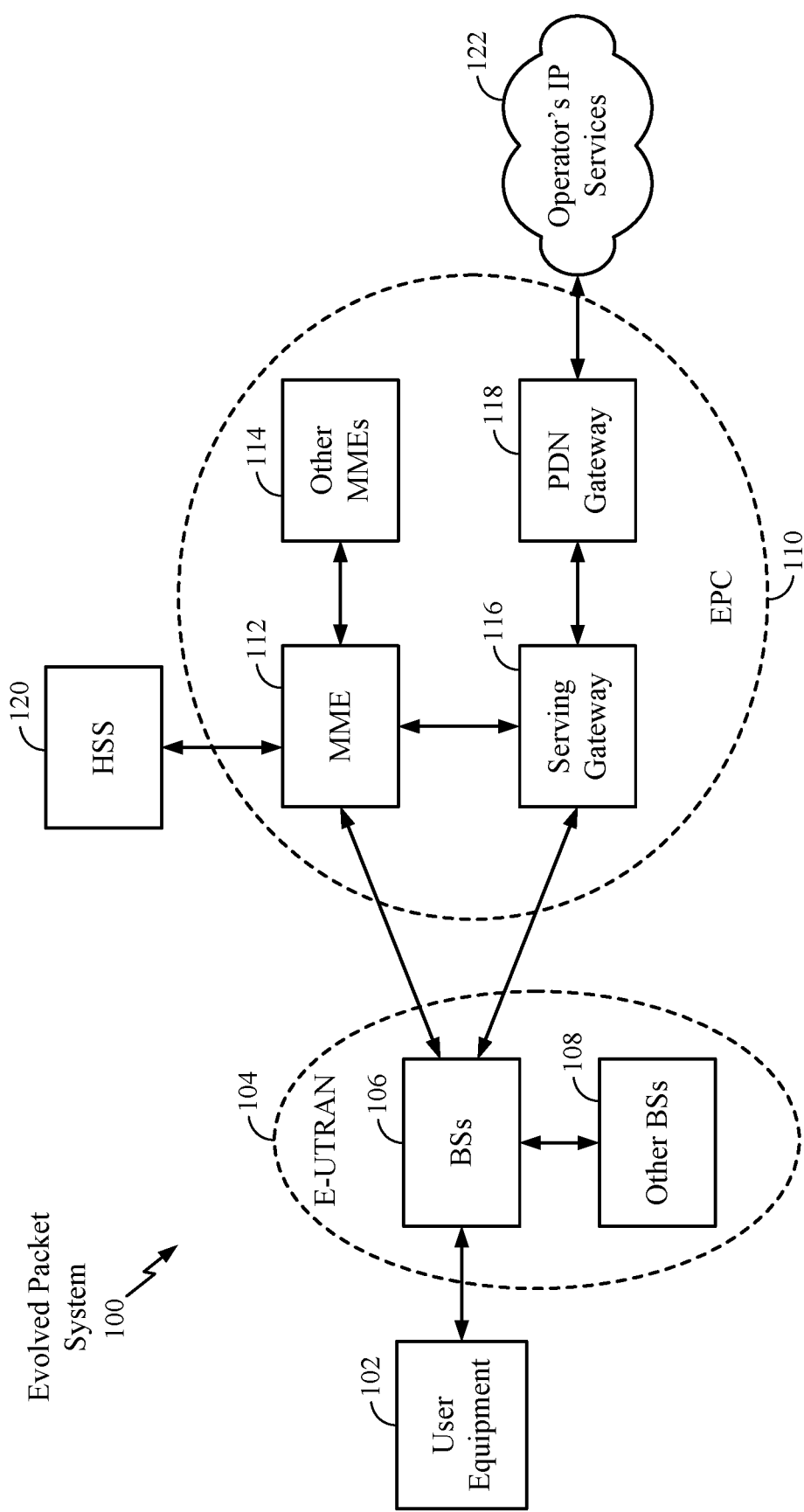
FIG. 1 is a diagram illustrating an example of a network architecture, in accordance with certain aspects of the disclosure.

Certain devices may support low latency (or ultra low latency "ULL") communications, including the capability to perform certain procedures with low latency relative to devices that lack the capability. Devices that lack the capability to perform low latency or ULL communications may be referred to herein as "legacy" devices. A legacy transmission time interval (TTI) may be 1 ms. For ULL, TTI lengths of shorter than 1 ms may be used. In some cases, legacy and ULL resources may overlap.

Certain aspects of the present disclosure provide techniques for resource management for transmission of legacy and/or ULL data where different transmissions may have different TTI lengths. For example, different devices, different transmission directions (uplink and downlink), different component carriers, different subframes, may be configured for different TTI lengths. The base station may determine configurations for different TTI lengths based on the TTI length. The base station may send information indicating the configurations to the UEs. The UEs can receive the information and communicate according to the determined configurations for the different TTIs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

The techniques described herein may be used for various wireless communication networks such as LTE, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as NR (e.g., 5G radio access), Evolved UTRA (E-UTRA), IEEE 802.11 (Wi-Fi), IEEE 802.16 (WiMAX), IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). NR is an emerging wireless communications technology under development in conjunction with the 5G Technology Forum (5GTF). These communications networks are merely listed as examples of networks in which the techniques described in this disclosure may be applied; however, this disclosure is not limited to the above-described communications network. For clarity, while aspects may be described herein using terminology commonly associated with 3G and/or 4G wireless technologies, aspects of the present disclosure can be applied in other generation-based communication systems, such as NR technologies, including 5G and later.

An Example Wireless Communication System

FIG. 1 is a diagram illustrating a network architecture 100 in which aspects of the present disclosure may be practiced. In some cases, network architecture 100 may be a new radio (NR) or 5G network. A base station (e.g., 106, 108 etc.) may determine configurations for different transmission time intervals (TTIs). For example, the BS 106, 108 may determine configurations for an ultra low latency (ULL) TTI and for a legacy TTI. In another example, the BS 106, 108 may determine a configuration for different ULL TTIs. The BS 106, 108 may send information indicating the determined configurations to the user equipment(s) (UE) 102 (which may be ULL capable UEs or legacy UEs). The UEs 102 can receive the information and communicate with the BS 106, 108 based on the different TTIs according to the determined configurations.

Network architecture 100 may be referred to as an Evolved Packet System (EPS) 100 (e.g., a long term evolution (LTE) network). EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. EPS 100 can interconnect with other access networks, but for simplicity those entities/interfaces are not shown. Exemplary other access networks may include an IP Multimedia Subsystem (IMS) packet data network (PDN), Internet PDN, Administrative PDN (e.g., Provisioning PDN), carrier-specific PDN, operator-specific PDN, and/or Global Positioning System (GPS) PDN. As shown, EPS 100 provides packet-switched (PS) services; however, as those skilled in the art will readily appreciate, the various concepts presented throughout this disclosure may be extended to networks providing circuit-switched (CS) services.

A UE 102 may also be referred to as a mobile station, a terminal, an access terminal (AT), a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a drone, a robot/robotic device, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

E-UTRAN 104 includes BS 106 and other BSs 108. BS 106 provides user and control plane protocol terminations toward UE 102. BS 106 may be connected to the other BSs 108 via an X2 interface (e.g., backhaul). BS 106 may also be referred to as an access point. BS 106 may provide an access point (AP) to EPC 110 for a UE 102. An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in wireless network 100 through various types of backhaul interfaces such as a direct physical connection, a virtual network, or the like using any suitable transport network.

BS 106 is connected by an S1 interface to EPC 110. EPC 110 includes a Mobility Management Entity (MME) 112, other MMEs 114, a Serving Gateway 116, and a Packet Data Network (PDN) Gateway 118. MME 112 is the control node that processes the signaling between UE 102 and EPC 110. Generally, MME 112 provides bearer and connection management. All user IP packets are transferred through Serving Gateway 116, which itself is connected to PDN Gateway 118. PDN Gateway 118 provides UE IP address allocation as well as other functions. PDN Gateway 118 is connected to Operator's IP Services 122. Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through network architecture 100.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed. While aspects of the examples described herein may be associated with LTE technologies, aspects of the present disclosure may be applicable with other wireless communications systems, such as NR or 5G.

Figure 2:
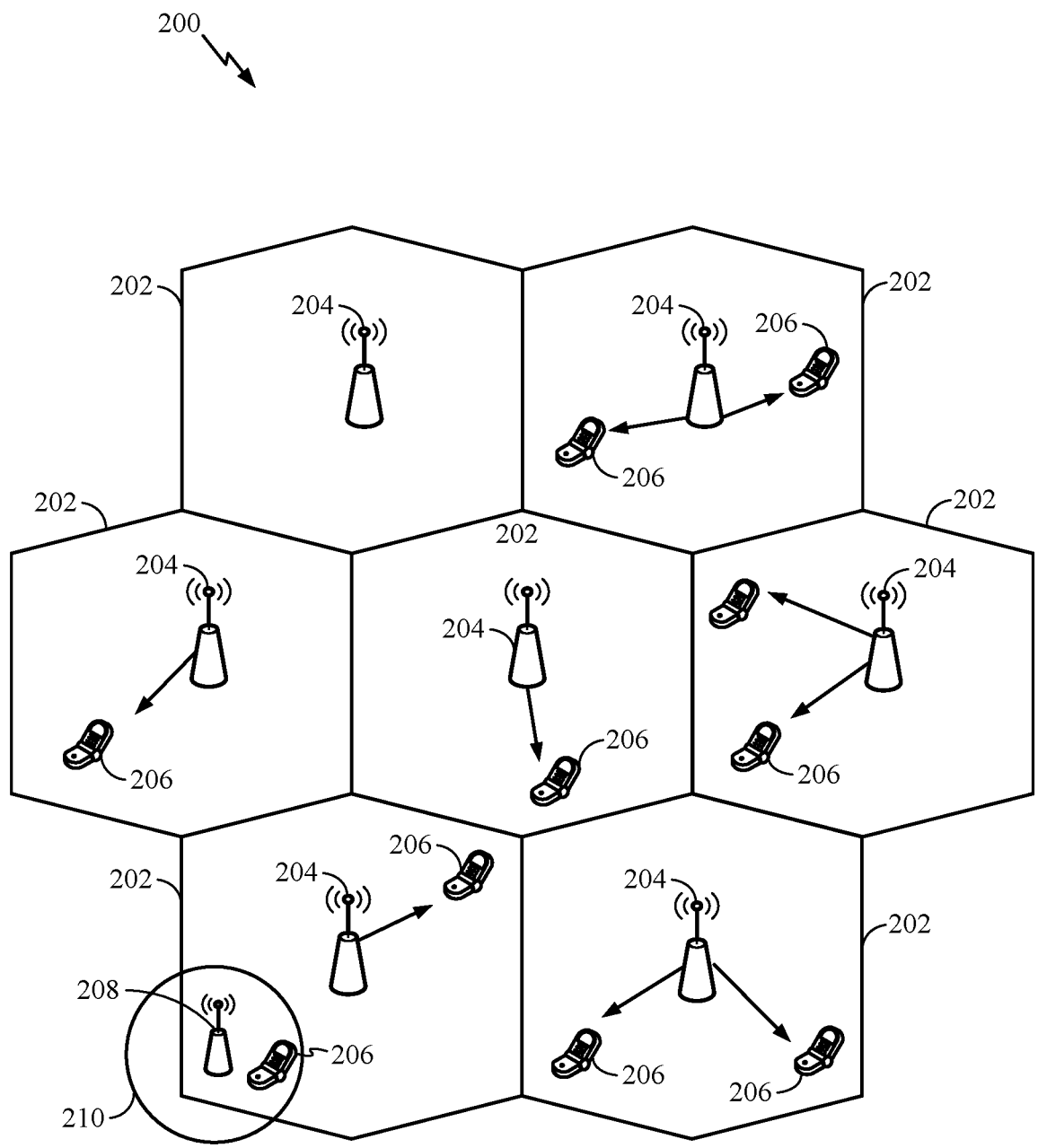
FIG. 2 is a diagram illustrating an example of an access network, in accordance with certain aspects of the disclosure.

FIG. 2 is a diagram illustrating an example of an access network 200 in a network architecture (e.g., such as network architecture 100) in which aspects of the present disclosure may be practiced. For example, BSs 204 and UEs 206 may be configured to implement techniques for resource management of transmissions having different TTI types (e.g., different TTI lengths), in accordance with certain aspects of the present disclosure as discussed below.

In this example, access network 200 is divided into a number of cellular regions (cells) 202. One or more lower power class BSs 208 may have cellular regions 210 that overlap with one or more of the cells 202. A lower power class BS 208 may be referred to as a remote radio head (RRH). The lower power class BS 208 may be a femto cell (e.g., home BS), pico cell, or micro cell. The macro BSs 204 are each assigned to a respective cell 202 and are configured to provide an access point to EPC 110 for all the UEs 206 in the cells 202. There is no centralized controller in this example of an access network 200, but a centralized controller may be used in alternative configurations. BSs 204 are responsible for all radio related functions including radio bearer control, admission control, mobility control, scheduling, security, and connectivity to serving gateway 116. Access network 200 may also include one or more relays (not shown). A UE may serve as a relay.

In NR systems, the term "cell" and gNB, Node B, 5G NB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

The modulation and multiple access scheme employed by access network 200 may vary depending on the particular telecommunications standard being deployed. In certain systems (e.g., LTE), OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards, such as NR and 5G, which may employ these or other modulation and multiple access techniques. The actual wireless communication standard and the multiple access technology employed will depend on the specific application and the overall design constraints imposed on the system.

BSs 204 may have multiple antennas supporting MIMO technology. The use of MIMO technology enables BSs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables BS 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

In some examples, access to the air interface may be scheduled. A scheduling entity (e.g., a BS) can allocate resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 3:
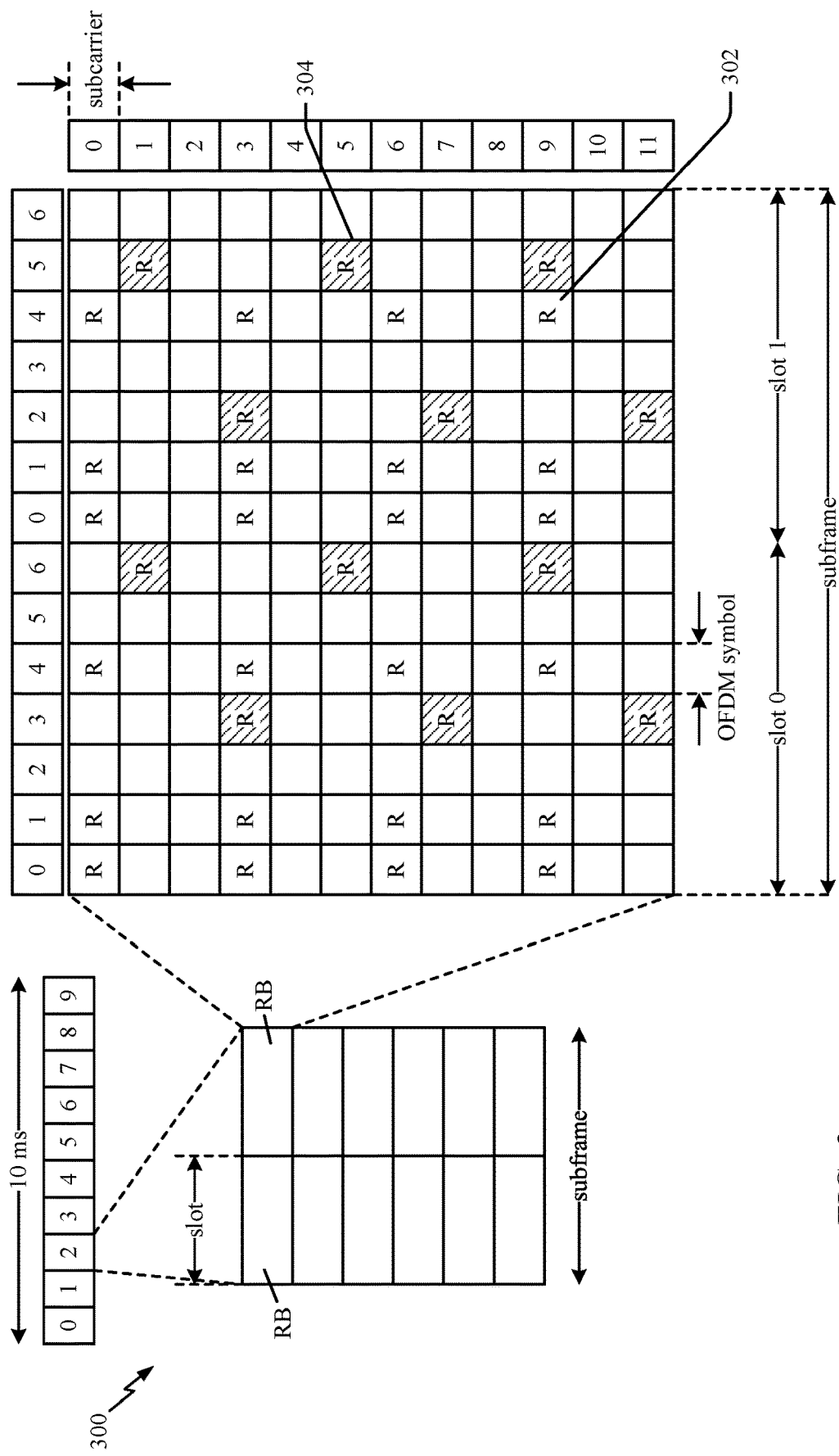
FIG. 3 is a diagram illustrating an example of a downlink frame structure in an access network, in accordance with certain aspects of the disclosure.

FIG. 3 is a diagram illustrating an example of a DL frame structure 300 in an access network (e.g., such as access network 200). A frame (10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements (REs). In certain systems (e.g., LTE), a RB contains 12 consecutive subcarriers in the frequency domain and, for a normal cyclic prefix in each OFDM symbol, 7 consecutive OFDM symbols in the time domain, or 84 REs. For an extended cyclic prefix, a RB contains 6 consecutive OFDM symbols in the time domain and has 72 REs. Some of the REs, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the RBs upon which the corresponding physical DL shared channel (PDSCH) is mapped. The number of bits carried by each RE depends on the modulation scheme. Thus, the more RBs that a UE receives and the higher the modulation scheme, the higher the data rate for the UE.

In certain systems (e.g., LTE), a BS may send a primary synchronization signal (PSS) and a secondary synchronization signal (SSS) for each cell in the eNB. The PSS and SSS may be sent in symbol periods 6 and 5, respectively, in each of subframes 0 and 5 of each radio frame with the normal cyclic prefix (CP). The synchronization signals may be used by UEs for cell detection and acquisition. The BS may send a Physical Broadcast Channel (PBCH) in symbol periods 0 to 3 in slot 1 of subframe 0. The PBCH may carry certain system information.

The BS may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 RBs. The BS may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The BS may send a Physical Downlink Shared Channel (PDSCH) in the remaining symbol periods of each subframe. The PDSCH may carry data for UEs scheduled for data transmission on the downlink.

The BS may send the PSS, SSS, and PBCH in the center 1.08 MHz of the system bandwidth used by the BS. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of REs may be available in each symbol period. Each RE may cover one subcarrier in one symbol period and may be used to send one modulation symbol, which may be a real or complex value. REs not used for a reference signal in each symbol period may be arranged into resource element groups (REGs). Each REG may include four REs in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. ABS may send the PDCCH to the UE in any of the combinations that the UE will search.

Figure 4:
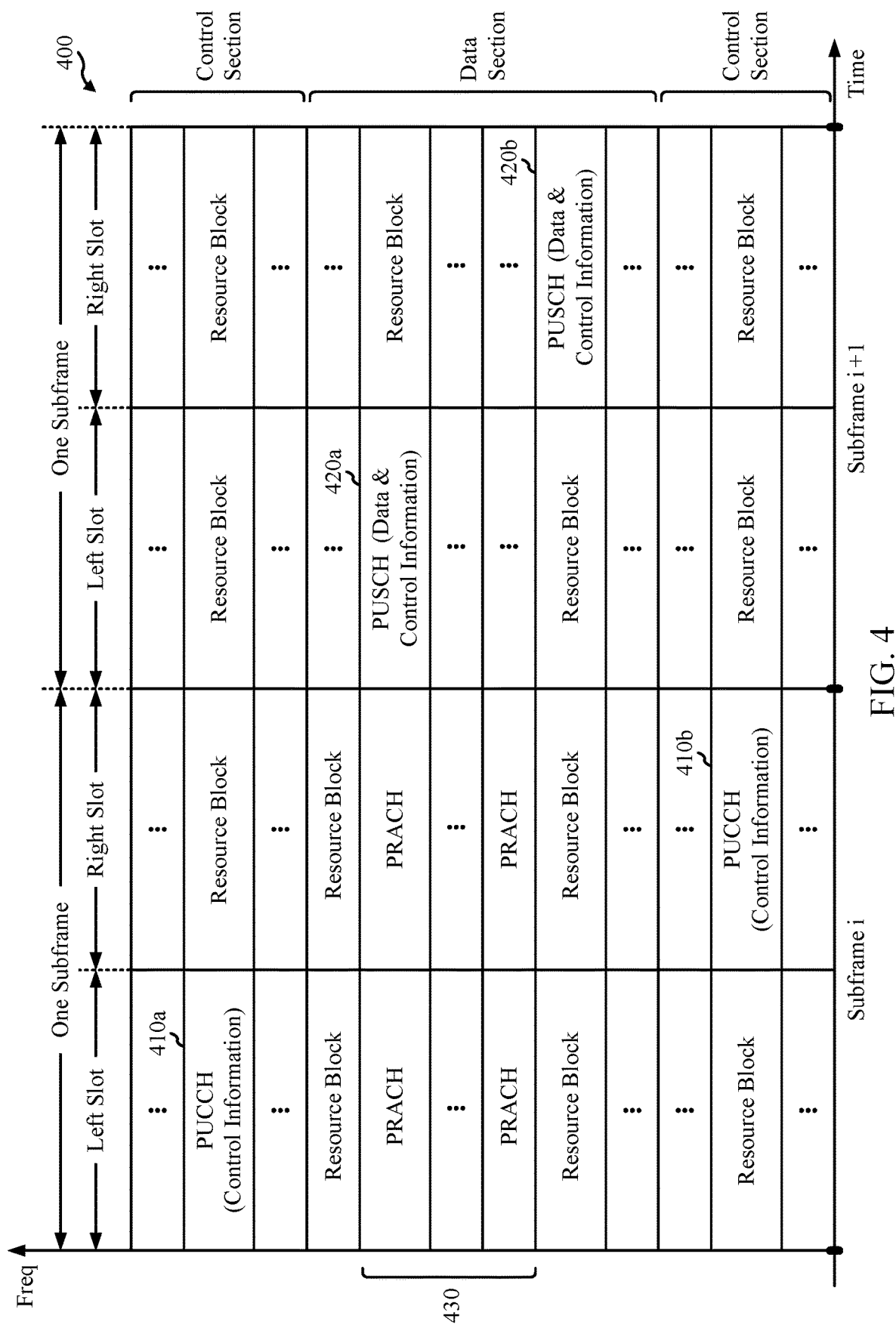
FIG. 4 is a diagram illustrating an example of an uplink frame structure in an access network, in accordance with certain aspects of the disclosure.

FIG. 4 is a diagram illustrating an example of an UL frame structure 400 in an access network (e.g., LTE). The available RBs for the UL may be partitioned into a data section and a control section. The control section may be formed at the two edges of the system bandwidth and may have a configurable size. The RBs in the control section may be assigned to UEs for transmission of control information. The data section may include all RBs not included in the control section. The UL frame structure 300 results in the data section including contiguous subcarriers, which may allow a single UE to be assigned all of the contiguous subcarriers in the data section.

A UE may be assigned RBs 410a, 410b in the control section to transmit control information to a BS. The UE may also be assigned RBs 420a, 420b in the data section to transmit data to the BS. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of RBs may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive RBs. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

In certain systems (e.g., such NR or 5G systems), a BS may transmit these or other signals in these locations or in different locations of the subframe. As will described in more detail below with respect to FIGS. 9 and 10, in other systems (e.g., NR or 5G systems), different uplink and/or downlink frame structures may be used.

Figure 5:
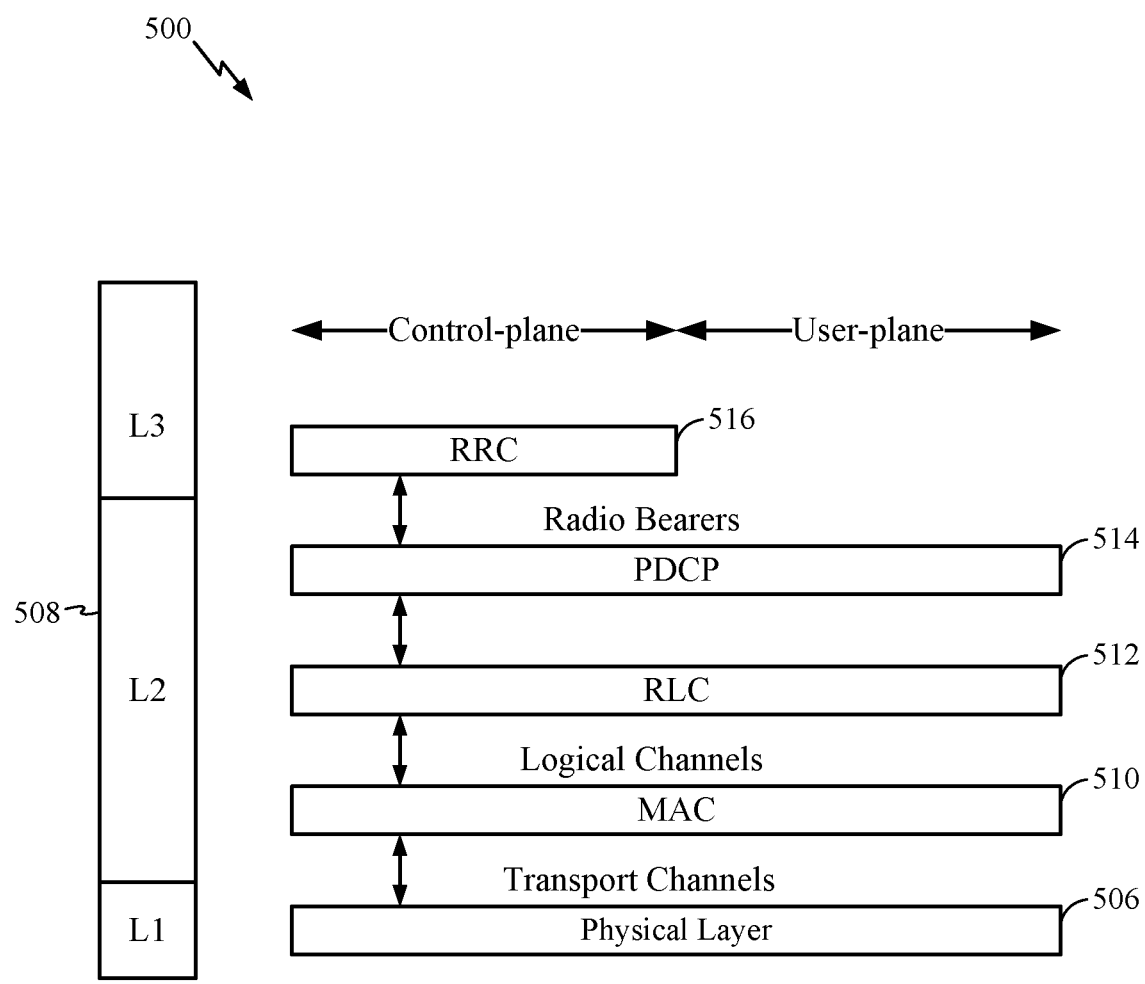
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in an example access network (e.g., LTE). The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

Figure 6:
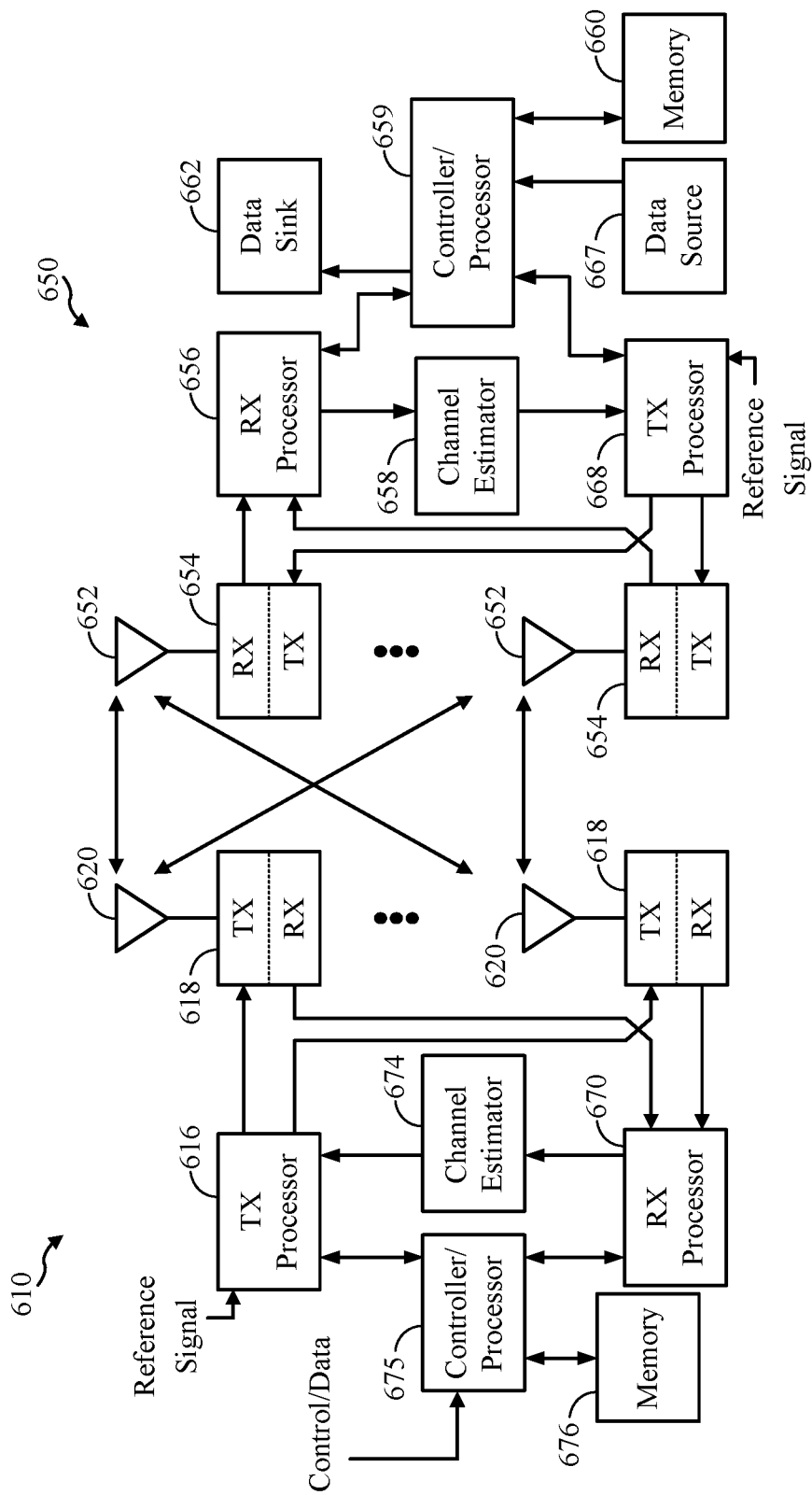
FIG. 6 is a diagram illustrating an example of a base station (BS) and a user equipment (UE) in an access network, in accordance with certain aspects of the disclosure.

FIG. 6 is a block diagram of a BS 610 in communication with a UE 650 in an access network, in which aspects of the present disclosure may be practiced. In the DL, upper layer packets from the core network are provided to a controller/processor 675. Controller/processor 675 implements the functionality of the L2 layer. In the DL, controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to UE 650.

TX processor 616 implements various signal processing functions for the L1 layer (i.e., physical layer). The signal processing functions includes coding and interleaving to facilitate forward error correction (FEC) at UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

Controller/processor 659 implements the L2 layer. The controller/processor can be associated with a memory 660 that stores program codes and data. Memory 660 may be referred to as a computer-readable medium. In the UL, control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to data sink 662 for L3 processing. Controller/processor 659 is also responsible for error detection using an acknowledgement (ACK) and/or negative acknowledgement (NACK) protocol to support HARQ operations.

In the UL, a data source 667 is used to provide upper layer packets to controller/processor 659. Data source 667 represents all protocol layers above the L2 layer. Similar to the functionality described in connection with the DL transmission by BS 610, controller/processor 659 implements the L2 layer for the user plane and the control plane by providing header compression, ciphering, packet segmentation and reordering, and multiplexing between logical and transport channels based on radio resource allocations by BS 610. Controller/processor 659 is also responsible for HARQ operations, retransmission of lost packets, and signaling to BS 610.

Channel estimates derived by a channel estimator 658 from a reference signal or feedback transmitted by BS 610 may be used by TX processor 668 to select the appropriate coding and modulation schemes, and to facilitate spatial processing. The spatial streams generated by TX processor 668 are provided to different antenna 652 via separate transmitters 654TX. Each transmitter 654TX modulates an RF carrier with a respective spatial stream for transmission.

The UL transmission is processed at BS 610 in a manner similar to that described in connection with the receiver function at UE 650. Each receiver 618RX receives a signal through its respective antenna 620. Each receiver 618RX recovers information modulated onto an RF carrier and provides the information to RX processor 670. RX processor 670 may implement the L1 layer.

Controller/processor 675 implements the L2 layer. Controller/processor 675 can be associated with memory 676 that stores program codes and data. Memory 676 may be referred to as a computer-readable medium. In the UL, control/processor 675 provides demultiplexing between transport and logical channels, packet reassembly, deciphering, header decompression, control signal processing to recover upper layer packets from UE 650. Upper layer packets from controller/processor 675 may be provided to the core network. Controller/processor 675 is also responsible for error detection using an ACK and/or NACK protocol to support HARQ operations. Controllers/processors 675, 659 may direct the operations at BS 610 and UE 650, respectively.

Figure 12:
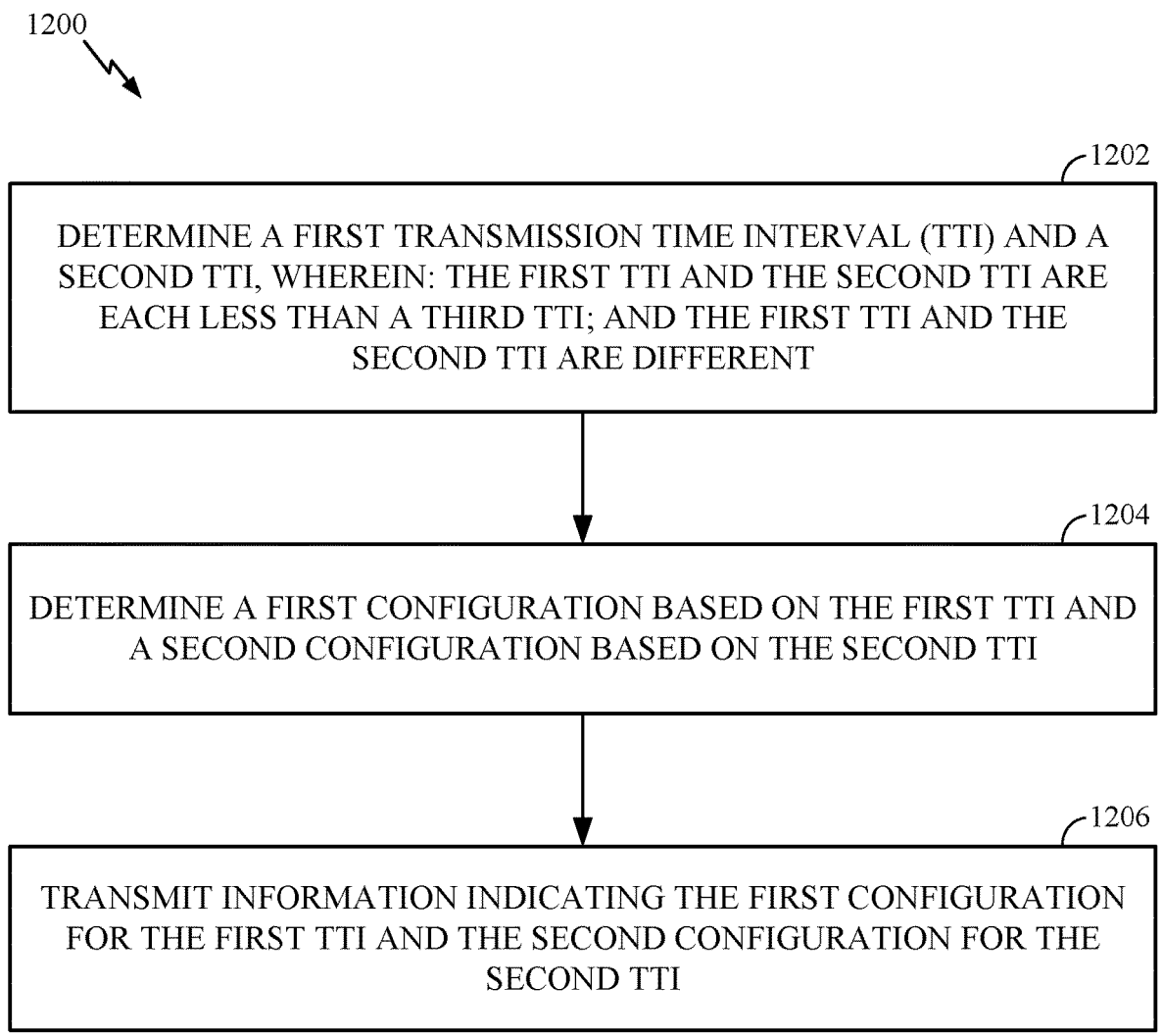
FIG. 12 illustrates example operations for wireless communications by a base station, in accordance with aspects of the present disclosure.

Controller/processor 675 and/or other processors and modules at BS 610 may perform or direct operations, for example, operations 1200 in FIG. 12, and/or other processes for the techniques described herein for resource management for transmissions using different TTI types. Controller/processor 659 and/or other processors and modules at the UE 650 may perform or direct operations, for example, operations 1100 in FIG. 11, and/or other processes for the techniques described herein for resource management for transmissions using different TTI types. In certain aspects, one or more of any of the components shown in FIG. 6 may be employed to perform example operations 1100 and 1200 and/or other processes for the techniques described herein. Memories 660 and 676 may store data and program codes for UE 650 and BS 610 respectively, accessible and executable by one or more other components of UE 650 and BS 610.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
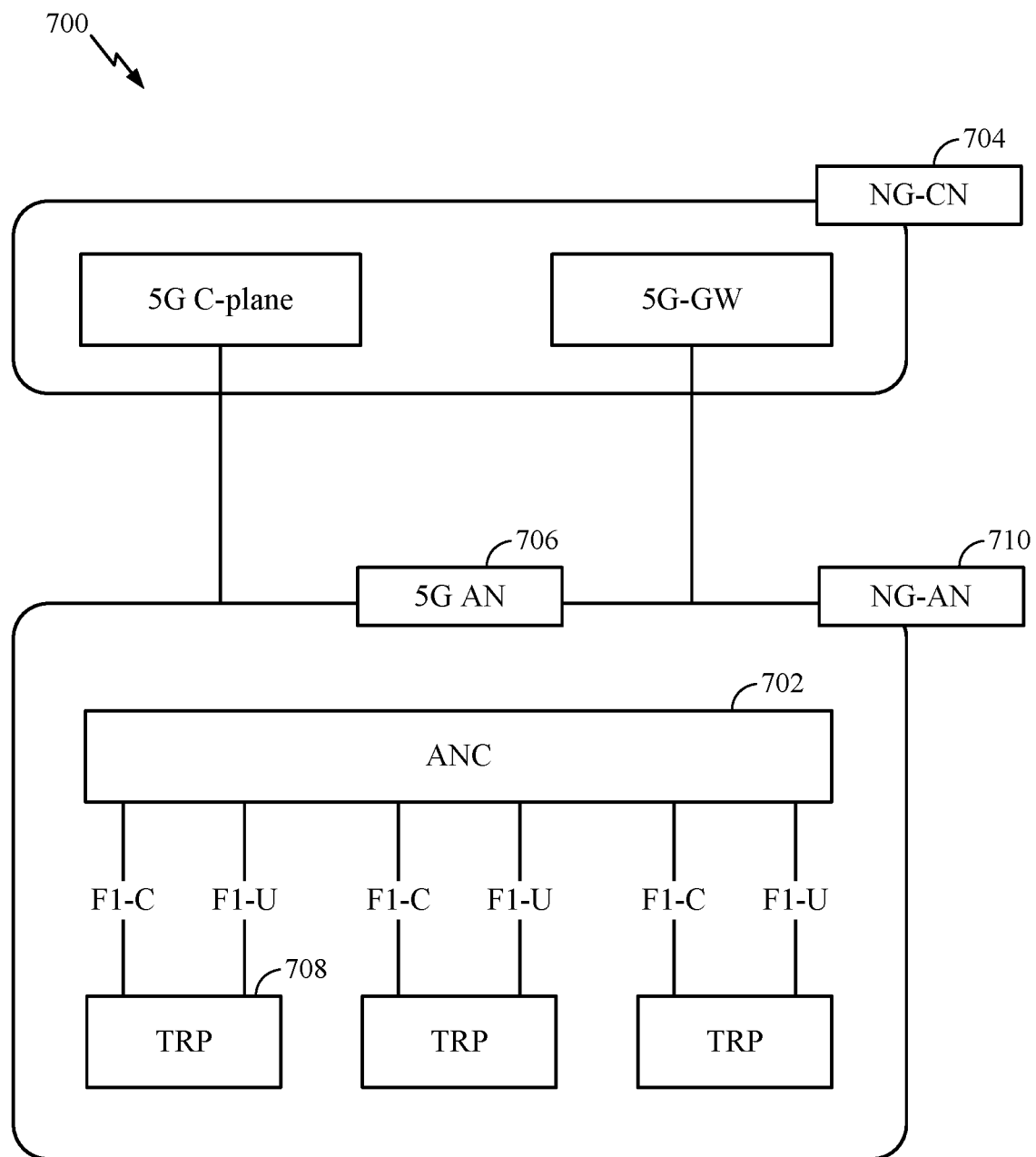
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

Figure 8:
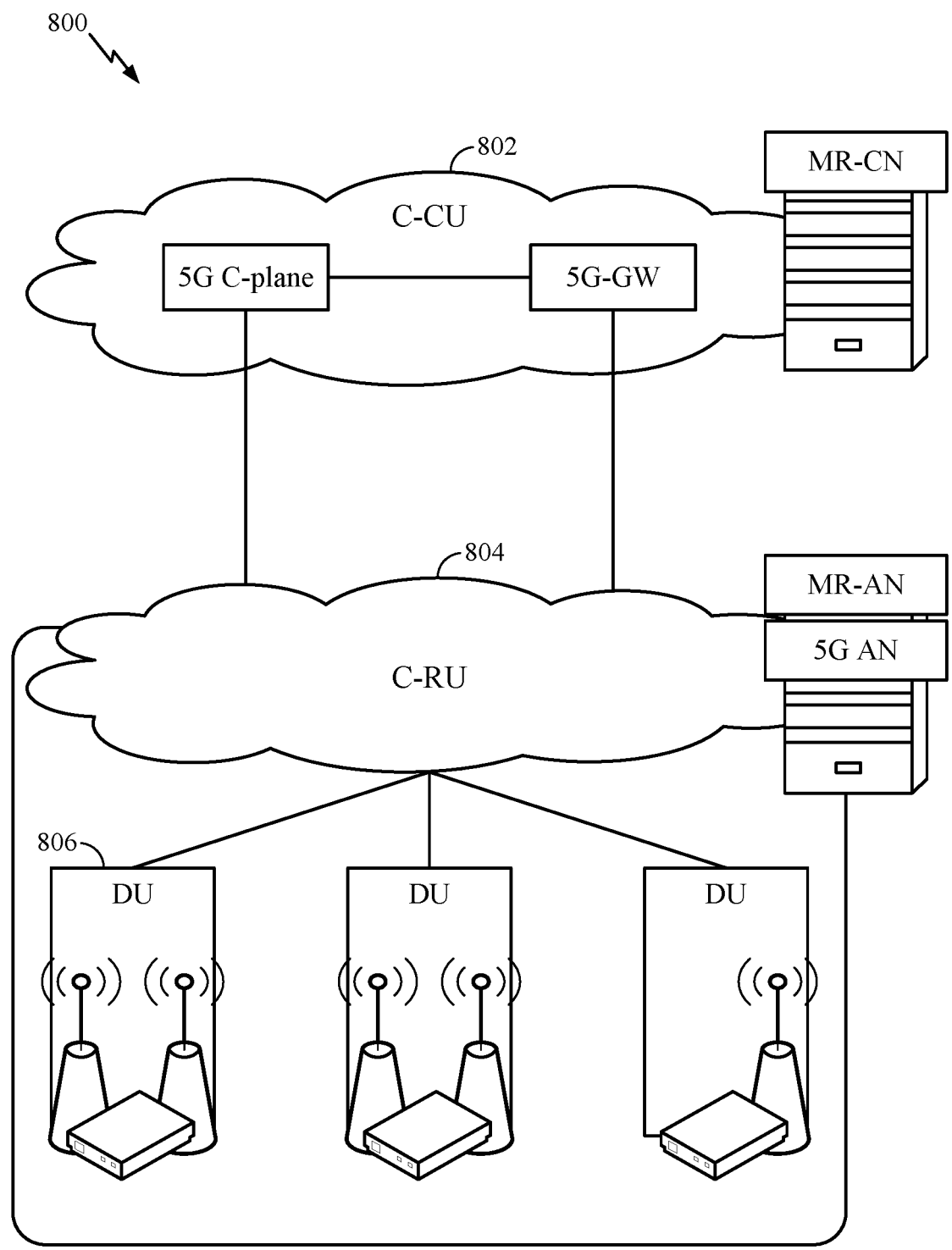
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity. A centralized RAN unit (C-RU) 804 may host one or more ANC functions. Optionally, the C-RU may host core network functions locally. The C-RU may have distributed deployment. The C-RU may be closer to the network edge. A distributed unit (DU) 706 may host one or more TRPs. The DU may be located at edges of the network with radio frequency (RF) functionality.

Figure 9:
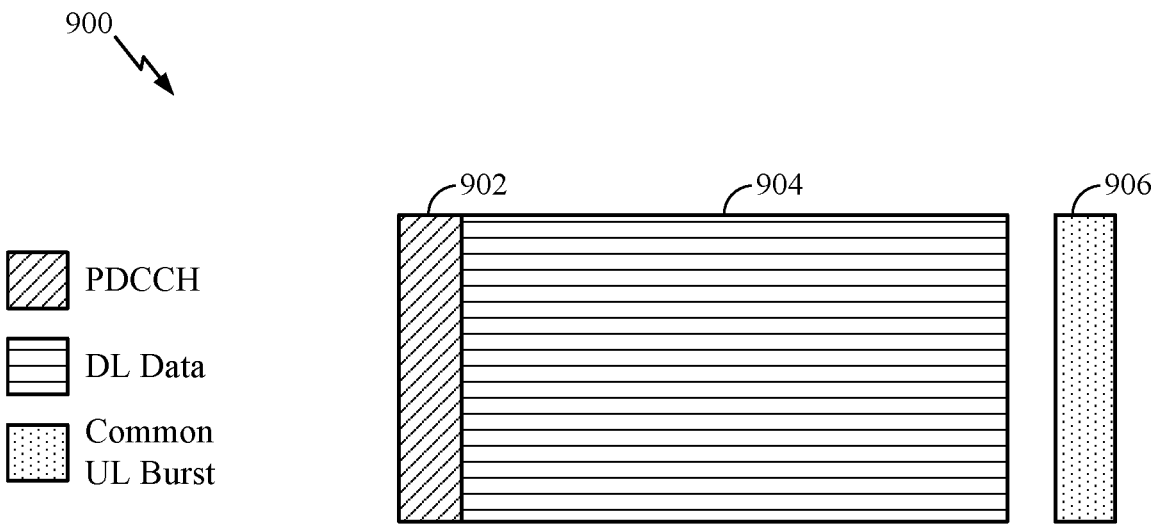
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
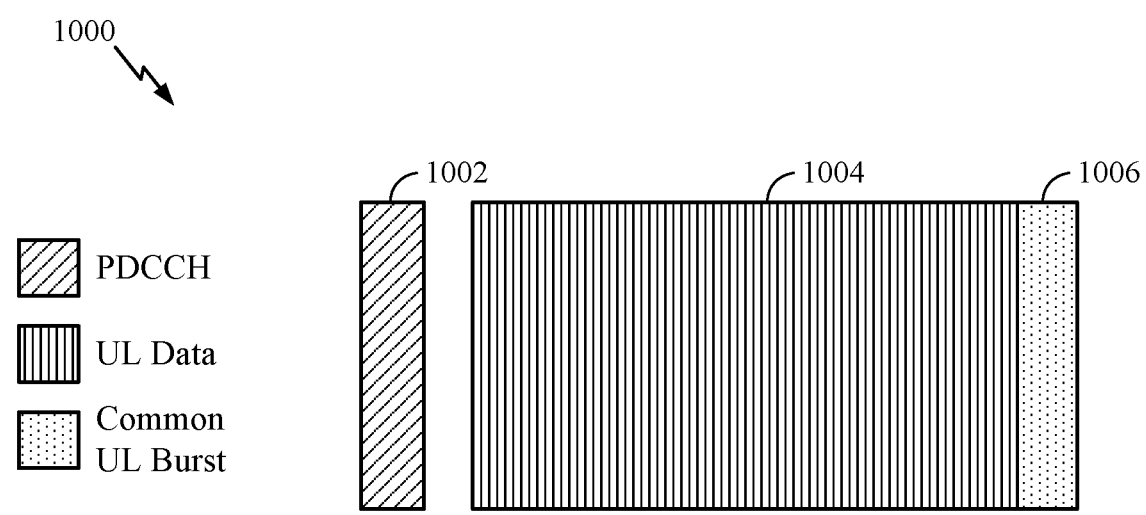
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical downlink control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum)

Example Techniques for Resource Management for ULL and Legacy Transmissions

Certain systems, such as certain long term evolution (LTE) systems, use a transmission time interval (TTI) of 1 ms (e.g., as shown in FIG. 4). These may be referred herein to as "legacy" systems and "legacy" TTI.

According to certain aspects presented herein, one or more devices (e.g., wireless device, wireless node, etc.) in a wireless communication network (e.g., networks 100 and 200 as illustrated in FIGS. 1 and 2) may support low latency (or ultra low latency "ULL") communications. As used herein, the term ultra low latency capability generally refers to the capability to perform certain procedures with low latency relative to devices that lack the capability (e.g., so called "legacy" devices). In one implementation, the ULL capability may refer to the ability to support transmission time interval (TTI) lengths that are shorter than 1 ms (with 1 ms corresponding to a conventional LTE subframe duration).

In general, such devices supporting low latency capabilities may support advanced antenna configurations, coordinated multipoint (CoMP) transmission and/or reception, advanced interference management techniques, and the like.

Low latency communications may be enabled by the use of reduced TTI lengths relative to legacy TTI lengths. In some cases, a TTI can be shorter than a 1 ms subframe, for example, 1 symbol, 2 symbols, 3 symbols, 4 symbols, 1 slot, etc.

In some cases, it may be desirable to reuse an existing mechanism, such as the LTE numerology to allow for minimal specification and implementation impact, as well as backward compatibility. For example, low latency systems may maintain the procedures such as system information blocks (SIBs), paging, random access channel (RACH), primary synchronization signals (PSS), secondary synchronization signals (SSS), and physical broadcast channel (PBCH) procedures as a legacy system.

This may be useful for smooth integration (e.g., coexistence) of ULL wireless devices and legacy 1 ms based LTE UEs. In one implementation, ULL devices and legacy UEs may be frequency division multiplexed (FDM) in a subframe. It may be desirable to minimize resource fragmentation (e.g., due to different TTIs) and interference variation (e.g., instead of 1 ms dependency on interference variations, ULL may introduce interference variations on a smaller than 1 ms time scale).

In addition, different UEs in a cell may operate with different TTI lengths (also referred to herein as different TTI "types"). For example, one UE may use a 2-symbol TTI and another UE in the cell may use a 1-slot TTI. Similarly, a single UE may be dynamically scheduled, semi-persistently scheduled, or semi-statically configured, with different TTI types. In one example, a UE may use one TTI type for uplink and a different TTI type for downlink. In one example, a UE may use different TTI in different subframes. In another example, a UE may use different TTI types for different component carriers.

Accordingly, techniques for configuring ULL services to facilitate interference coordination and resource management are desirable.

Thus, aspects of the present disclosure provide techniques for resource management for ULL and legacy transmissions. For example, different resource configurations can be determined for different TTIs.

FIG. 11 illustrates example operations 1100 that can be performed, for example, by a wireless device (e.g., a UE 102 may be a ULL capable UE), for resource management of transmissions with different TTI types, in accordance with certain aspects of the present disclosure. Operations 1100 begin, at 1102, by receiving information (e.g., dynamically, semi-persistently, or semi-statically signaled information) indicating (e.g., via a bitmap or bitmaps) a first configuration (e.g., resource configuration) based on a first transmission time interval (TTI) (e.g., two symbols) and a second configuration based on a second TTI (e.g., one slot), wherein: the first TTI and the second TTI are each less than a third TTI (e.g., a one millisecond TTI); and the first TTI and the second TTI are different. At 1104, the UE communicates based on the first TTI according to the first configuration and based on the second TTI according to the second configuration. The different TTIs may be configured to be used for uplink or downlink communications, different component carriers, and/or different sets of subframes.

FIG. 12 illustrates example operations 1200 that can be performed, for example by a base station (e.g., base station 106, 108), for resource management of transmissions with different TTI types, in accordance with certain aspects of the present disclosure. The operations 1200 may be corresponding operations by a base station to the operations 1100 performed by the UE. Operations 1200 begin, at 1202, by determining a first TTI (e.g., two symbols) and a second TTI (e.g., one slot), wherein: the first TTI and the second TTI are each less than a third TTI (e.g., a one millisecond TTI); and the first TTI and the second TTI are different. At 804, the base station determines a first configuration (e.g., resource configuration) based on the first TTI and a second configuration based on the second TTI. At 806, the base station transmits information indicating (e.g., via a bitmap or bitmaps) the first configuration for the first TTI and the second configuration for the second TTI. The first TTI and the second TTI may be for a same UE or different UEs.

Figure 13:
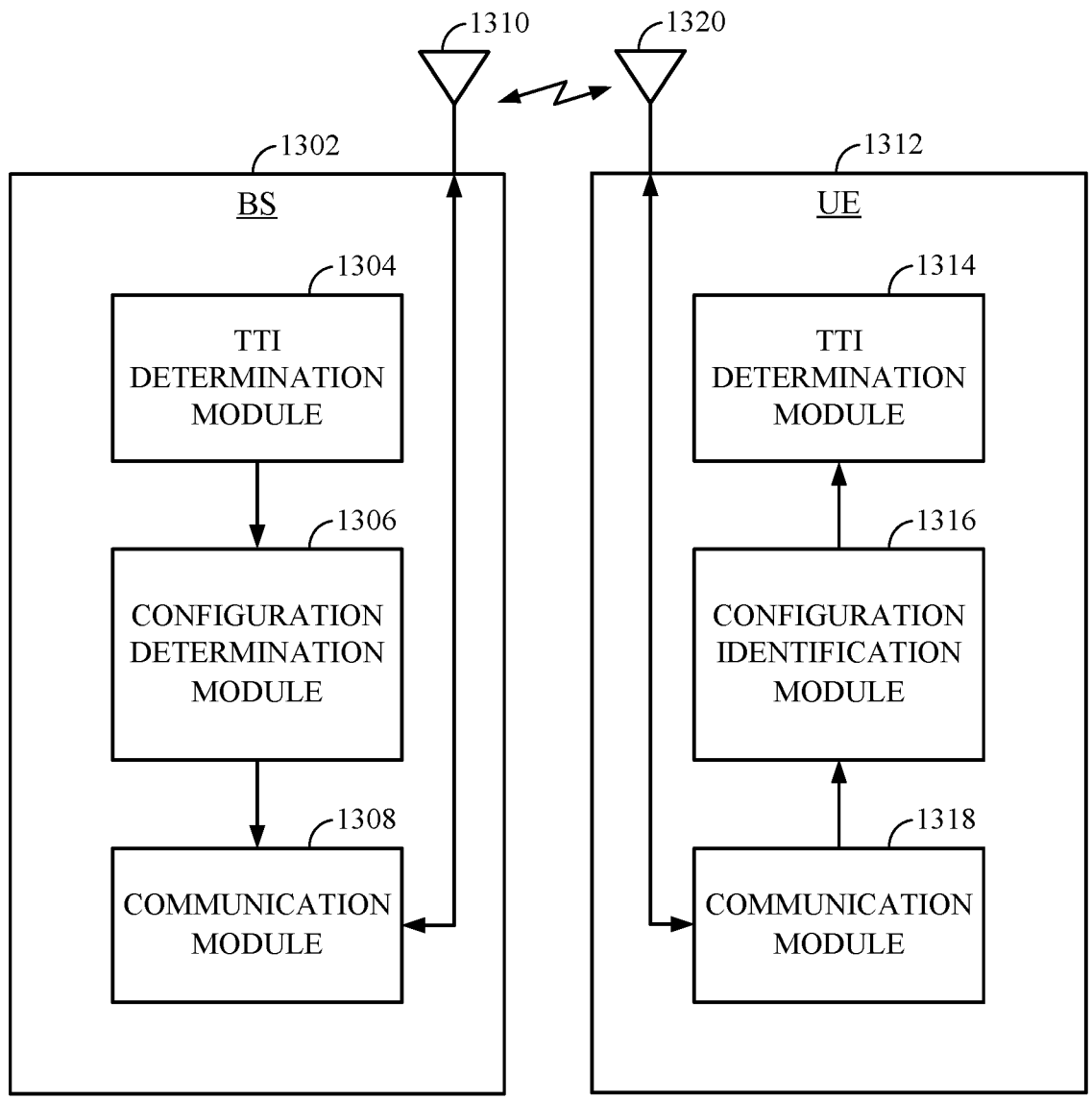
FIG. 13 is a block diagram conceptually illustrating an example UE and BS capable of resource management for low latency and legacy transmissions, in accordance with certain aspects of the present disclosure.

FIG. 13 is a block diagram conceptually illustrating an example UE 1312 and BS 1302 capable of resource management for low latency and legacy transmissions, in accordance with certain aspects of the present disclosure.

As shown in FIG. 13, BS 1302 includes TTI determination module 1304, configuration determination module 1306, communication module 1308, and antenna 1310. UE 1312 includes TTI determination module 1314, configuration identification module 1316, communication module 1318, and antenna 1320. As described herein, TTI determination module 1304 may determine or identify different TTIs, for example, having different lengths (e.g., 1-slot, 2-ymbol, or 1 ms lengths). The configuration module 1306 may determine different configurations (e.g., different resource sets) for the different TTIs. The communication module 1308 may transmit an indication of the TTIs and/or configurations to the UE 1312, via the antenna 1310 (or via multiple antennas). UE 1312 may receive the indication of the TTIs and/or configurations, via the antenna 1320 and communication module 1318. TTI determination module 1314 and/or configuration identification module 1316 may use the indication to identify/determine TTIs and associated configurations. Communication module 1318 of UE 1312 may communicate with BS 1302, via the antennas 1310 and 1320, according to the indicated TTIs and/or resource configurations.

According to certain aspects, ULL resource configuration may be performed on a per TTI type basis. For example, if a UE is configured with different TTI types, such as a 2-symbol TTI and a 1-slot TTI, the UE may be configured with different sets of resources for the different TTI types. In this example, the UE can be configured with a first set of resources for the 2-symbol TTI and another set of resources for the 1-slot TTI. Thus, the UE may be configured with multiple resource configurations for ULL service. According to certain aspects, different combinations of 2-symbol TTI, 1-slot TTI, and 1 ms TTI may be configured.

In one example implementation, the resource configurations for the different TTIs may be signaled to the UE by the BS. For example, the ULL resource sets may be indicated by a bitmap or bitmaps. The values of bits in a bitmap received from the BS may indicate resources to be configured for a TTI. The granularity of the resources indicated in the bitmap may be the same for all TTIs; alternatively, the resource granularity may be different for different TTIs. In an example, the bitmap may indicate resource blocks for all TTIs. In aspects, for a 2-symbol TTI, the resource granularity may be four RBs and for a 1-slot TTI, the resource granularity may be two RBs. However, other resource granularities and other TTI types may be used. According to certain aspects, this may facilitate the reservation of RBs for other services, such as enhanced machine type communications (eMTC) or narrowband internet-of-things (NB-IoT). According to certain aspects, different bitmaps may be used for different resource configurations.

According to certain aspects, different ULL resources (and different TTI lengths) may be configured for different channels. For example, the ULL resource configuration may be for a control channel, a data channel, or a combination of both. A same resource configuration may be applicable to both a control channel and a data channel. Alternatively, a first resource configuration may be configured for a control channel, while a second resource configuration may be configured for a data channel.

According to certain aspects, the ULL resource set can be configured to be used on a per carrier basis. For example, different TTIs and/or different resource sets may be configured for communications on different component carriers.

According to certain aspects, the ULL resource can be separately configured to be used for uplink and downlink. In some cases, UL and DL may have different system bandwidth. Different TTIs and/or different resource sets may be configured for uplink communications and downlink communications. In some cases, UL and DL may be configured with the same TTIs and/or resource sets. For example, UL and DL may use any combination of a 1-slot TTI, a 2-symbol TTI, and/or a 1 ms TTI.

According to certain aspects, the ULL resource set can be separately configured for different sets of subframes. For example, different TTIs and/or different resource sets may be configured for different subframes or different subsets of subframes. In one example implementation, the ULL resource configuration may be applicable for only a subset of subframes and ULL service may not be supported (or supported in the entire bandwidth) for the other subframes. This may be applicable, for example, to time division duplexing (TDD) systems, where ULL may not be enabled for some subframes. In another example implementation, one resource configuration may be configured for a subset of subframes and a different resource configuration may be configured for a different subset of subframes. Each set of subframes may be associated with different interference characteristics. NB-IoT and eMTC may use some RBs in a subset of subframes, thus, a subframe dependent ULL resource set allocation may facilitate co-existence with other services.

According to certain aspects, if a ULL resource set is configured for a TTI, a subset of system bandwidth may be managed for the TTI. In one example implementation, resource assignment in downlink control information (DCI) (e.g., at least one field of the DCI) can be designed based on the entire system bandwidth. This approach may facilitate interaction of CSI measurement reporting across different TTIs (e.g., 1-ms TTI vs. 1-slot TTI). As an example, differential CQI may be supported for 1-slot TTI with respect to the CQI reported based on 1-ms TTI, when both TTIs have the same CSI measurement bandwidth. Alternatively, the resource assignment in DCI can be based on the configured ULL resource set. For example, if only half of the system bandwidth is configured for a TTI, the resource allocation information field in the DCI can be based on the configured half system bandwidth for that TTI.

In another implementation, channel state information (CSI) feedback for ULL may be based on the entire bandwidth. For example, the UE may perform measurements for CSI feedback based on the entire bandwidth. Alternatively, the CSI feedback for ULL may be based on the configured ULL resource (e.g., ULL bandwidth). For example, if only half the system bandwidth is configured for a TTI, the UE may perform measurements for CSI feedback based on the half system bandwidth for that TTI. The UE may also perform CSI feedback based on the half system bandwidth for that TTI. As a result, CSI measurement complexity may be reduced (e.g., due to reduced CSI measurement bandwidth) and/or CSI feedback overhead may be reduced (e.g., due to reduced CSI measurement bandwidth).

According to certain aspects, the ULL bandwidth (e.g., RBs) for a TTI can be shared across base stations. For example, information regarding ULL resource management may be exchanged (e.g., between BSs) via a backhaul. The BS may determine the information regarding the sets of resources for the different TTIs based on information received via the backhaul, and may utilize this information for enhanced interference management. The BS may also indicate such information to the UEs served by the BS for improved interference handling at the UE. Exchanging backhaul information may enhance inter-cell interference coordination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for indicating, means for receiving, means for communicating, means for signaling, means for performing, and/or means for transmitting, may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6; a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6; and/or a receiver, which may include RX processor 670, receiver(s) 618, and/or the antenna(s) 620 of the wireless base station 610 illustrated in FIG. 6, and/or the RX processor 656, the receiver(s) 654, and/or the antenna(s) 652 of the user equipment 650 illustrated in FIG. 6. In aspects, such means for may include corresponding components of a network entity, such as an MME.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, by a user equipment (UE), comprising:
   receiving radio resource control (RRC) signaling configuring the UE with a first transmission time interval (TTI) length;
   receiving first downlink control information (DCI) configuring, with a first resource granularity, a first set of resource blocks (RBs) for communicating using the first TTI length;
   receiving RRC signaling configuring the UE with a second TTI length, at least one of the first or second TTI length being shorter than one subframe;
   receiving second DCI configuring, with a second resource granularity different than the first resource granularity, a second set of RBs for communicating using the second TTI length; and
   communicating based on at least one of the first TTI length and the first set of RBs or the second TTI length and the second set of RBs, wherein the first TTI length is configured for communications on a first component carrier (CC) and the second TTI length is configured for communications on a second CC.

2. The method of claim 1, wherein the first TTI length is configured to be used for downlink or uplink communications and the second TTI length is configured to be used for another of downlink or uplink communications.

3. The method of claim 1, further comprising receiving RRC signaling configuring different TTI lengths for different sets of subframes.

4. The method of claim 1, wherein the method further comprises:
   receiving RRC signaling configuring the UE with a 1 ms TTI length for legacy non-ultra low latency (ULL) communication;
   receiving third DCI configuring, with a third resource granularity different than the first and second resource granularity, a third set of RBs for the legacy non-ULL communication using the 1 ms TTI length; and
   communicating based on the 1 ms TTI length and the third set of RBs.

5. The method of claim 1, wherein:
at least one of the first DCI or the second DCI indicates resources to be used for performing measurements for channel state information (CSI) feedback for at least one of: the first TTI length or the second TTI length; and
the method further comprises performing the measurements for CSI feedback for at least one of the first TTI length or the second TTI length based on the indicated resources for that TTI length.

6. The method of claim 1, wherein:
at least one of the first DCI or the second DCI indicates resources to be used for at least one information field in DCI for at least one of the first TTI length or the second TTI length; and
the method further comprises communicating based on the at least one information field in DCI.

7. A method for wireless communications comprising:
transmitting radio resource control (RRC) signaling configuring a user equipment (UE) with a first transmission time interval (TTI) length;
transmitting first downlink control information (DCI) to the UE configuring, with a first resource granularity, a first set of resource blocks (RBs) for communicating using the first TTI length;
transmitting RRC signaling configuring the UE with a second TTI length, at least one of the first or second TTI length being shorter than one subframe;
transmitting second DCI to the UE configuring, with a second resource granularity different than the first resource granularity, a second set of RBs for communicating using the second TTI length; and
communicating with the UE based on at least one of the first TTI length and the first set of RBs or the second TTI length and the second set of RBs, wherein the first TTI length is configured for communications on a first component carrier (CC) and the second TTI length is configured for communications on a second CC.

8. The method of claim 7, wherein the first TTI length is configured for downlink or uplink communications and the second TTI length is configured for another of downlink or uplink communications.

9. The method of claim 7, wherein at least one of: the first DCI or the second DCI comprises one or more bitmaps indicating the RBs.

10. The method of claim 7, further comprising transmitting RRC signaling configuring different TTI lengths for different sets of subframes.

11. The method of claim 7, further comprising:
transmitting RRC signaling configuring a 1 ms TTI for legacy non-ultra low latency (ULL) communication; and
transmitting third DCI configuring, with a third resource granularity different than the first and second resource granularity, a third set of RBs for the legacy non-ULL communication using the 1 ms TTI.

12. The method of claim 7, further comprising:
determining resources for transmitting at least one information field in at least one of: the first DCI or the second DCI, the determination of the resources being based on a system bandwidth or based on the TTI length, and
indicating the resources for the at least one information field.

13. The method of claim 7, further comprising:
receiving information via a backhaul regarding at least one of: the first TTI length, the second TTI length, the first set of RBs, or the second set of RBs; and
determining at least one of: the first TTI length, the second TTI length, the first set of RBs, or the second set of RBs based, at least in part, on the signaling.

14. The method of claim 7, further comprising:
determining resources to be used for performing measurements for channel state information (CSI) feedback for at least one of: the first TTI length or the second TTI length, wherein:
at least one of: the first DCI or the second DCI indicates the resources to be used for performing the measurements, and
the determination of the resources is based on a system bandwidth or based on the configuration for that TTI length.

15. An apparatus for wireless communications comprising:
means for receiving radio resource control (RRC) signaling configuring the apparatus with a first transmission time interval (TTI) length;
means for receiving first downlink control information (DCI) configuring, with a first resource granularity, a first set of resource blocks (RBs) for communicating using the first TTI length;
means for receiving RRC signaling configuring the apparatus with a second TTI length, at least one of the first or second TTI length being shorter than one subframe;
means for receiving second DCI configuring, with a second resource granularity different than the first resource granularity, a second set of RBs for communicating using the second TTI length; and
means for communicating based on at least one of the first TTI length and the first set of RBs or the second TTI length and the second set of RBs, wherein the first TTI length is configured for communications on a first component carrier (CC) and the second TTI length is configured for communications on a second CC.

16. An apparatus for wireless communications comprising:
means for transmitting radio resource control (RRC) signaling configuring a user equipment (UE) with a first transmission time interval (TTI) length;
means for transmitting first downlink control information (DCI) to the UE configuring, with a first resource granularity, a first set of resource blocks (RBs) for communicating using the first TTI length;
means for transmitting RRC signaling configuring the UE with a second TTI length, at least one of the first or second TTI length being shorter than one subframe;
means for transmitting second DCI to the UE configuring, with a second resource granularity different than the first resource granularity, a second set of RBs for communicating using the second TTI length; and
means for communicating with the UE based on at least one of the first TTI length and the first set of RBs or the second TTI length and the second set of RBs, wherein the first TTI length is configured for communications on a first component carrier (CC) and the second TTI length is configured for communications on a second CC.

* * * * *